(12) United States Patent
Willis et al.

(10) Patent No.: US 6,888,264 B1
(45) Date of Patent: May 3, 2005

(54) METHOD AND MEANS FOR MOUNTING A WIND TURBINE ON A TOWER

(75) Inventors: Jeffrey O. Willis, Blair, NE (US); Anthony J. Hansen, Elkhorn, NE (US)

(73) Assignee: Valmont Industries, Inc., Valley, NE (US)

( * ) Notice: Subject to any disclaimer, the term of this patent is extended or adjusted under 35 U.S.C. 154(b) by 19 days.

(21) Appl. No.: 10/151,263

(22) Filed: May 20, 2002

Related U.S. Application Data

(60) Continuation of application No. 09/829,362, filed on Apr. 9, 2001, now abandoned, which is a division of application No. 09/563,612, filed on May 2, 2000, now Pat. No. 6,278,198.

(51) Int. Cl.[7] .................................................. F03D 9/00
(52) U.S. Cl. .......................................... 290/55; 290/44
(58) Field of Search ..................... 290/55, 44; 405/227

(56) References Cited

U.S. PATENT DOCUMENTS

| | | | |
|---|---|---|---|
| 546,710 A | 9/1895 | Rogers | |
| 756,216 A | 4/1904 | Crunican | |
| 756,616 A | 4/1904 | Fornander | |
| 992,067 A | 5/1911 | Sawyers | |
| 4,000,624 A | 1/1977 | Chow | |
| 4,142,830 A | 3/1979 | Schonball | |
| 4,217,738 A | 8/1980 | Smith | |
| 4,222,683 A | 9/1980 | Schaloske et al. | |
| 4,272,929 A | 6/1981 | Hanson | |
| 4,293,579 A | 10/1981 | Shu et al. | |
| 4,323,331 A | 4/1982 | Schachle et al. | |
| 4,329,115 A | 5/1982 | Kress | |
| 4,366,386 A | * 12/1982 | Hanson ........................ | 290/44 |
| 4,403,916 A | 9/1983 | Skelskey | |
| 4,553,878 A | 11/1985 | Willemse et al. | |
| 4,557,629 A | 12/1985 | Meek et al. | |
| 4,589,344 A | 5/1986 | Davison | |
| 4,764,313 A | 8/1988 | Cameron et al. | |
| 4,857,753 A | 8/1989 | Mewburn-Crook et al. | |
| 4,973,199 A | 11/1990 | Cox | |
| 5,051,036 A | 9/1991 | Gomez De Rosas et al. | |
| 5,051,037 A | * 9/1991 | Haney et al. ................ | 405/227 |
| 5,072,555 A | * 12/1991 | Geiger ........................... | 52/82 |
| 5,174,724 A | * 12/1992 | Ammons ...................... | 290/44 |
| 5,536,117 A | 7/1996 | Frame et al. | |
| 5,649,392 A | 7/1997 | Svenning | |
| 6,064,123 A | 5/2000 | Gislason | |
| 6,357,549 B1 | 3/2002 | Brennan et al. | |

FOREIGN PATENT DOCUMENTS

| | | |
|---|---|---|
| DE | 27 35 298 A1 | 2/1979 |
| EP | 1057770 | 12/0000 |
| JP | 2000240039 | 12/2000 |
| WO | 82/04466 | 12/1982 |

* cited by examiner

Primary Examiner—Joseph Waks
(74) Attorney, Agent, or Firm—Thomte, Mazour & Niebergall; Dennis L. Thomte

(57) ABSTRACT

An apparatus for mounting a wind turbine on the upper end of a wind turbine tower is disclosed as well as the method of erecting the same. The tower is provided with a pair of spaced-apart guide rails positioned at one side thereof which extend from the lower end to the upper end of the tower. A carriage is movably mounted on the guide rails and has a platform pivotally mounted thereon adapted to support the wind turbine thereon. The carriage positions the wind turbine so that the spinner/hub and rotor blades may be secured thereto while the wind turbine is at the lower end of the tower and provides a means for slidably moving the wind turbine from the carriage to the upper end of the tower when the carriage has been winched to the upper end of the tower.

2 Claims, 12 Drawing Sheets

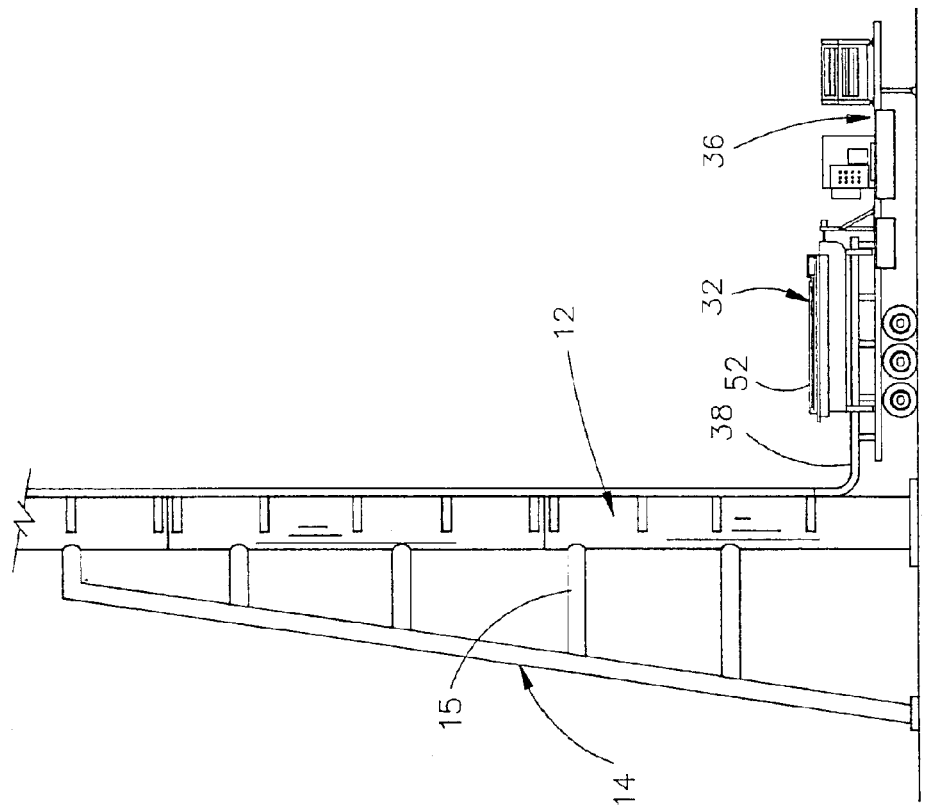
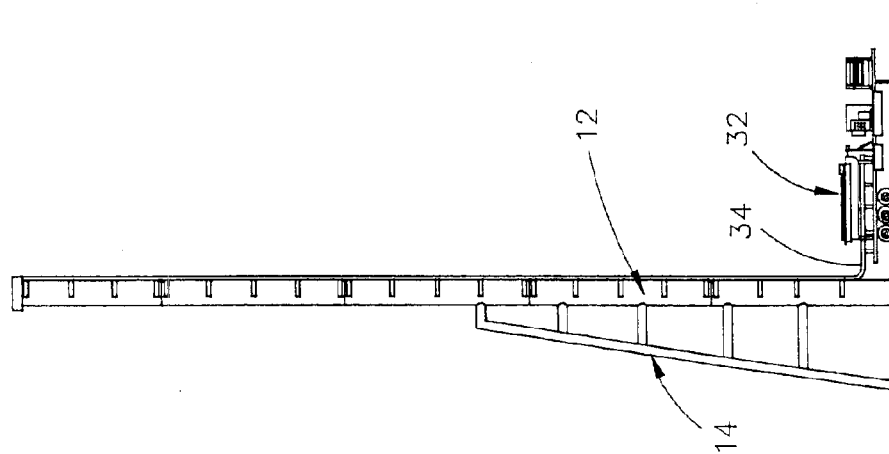

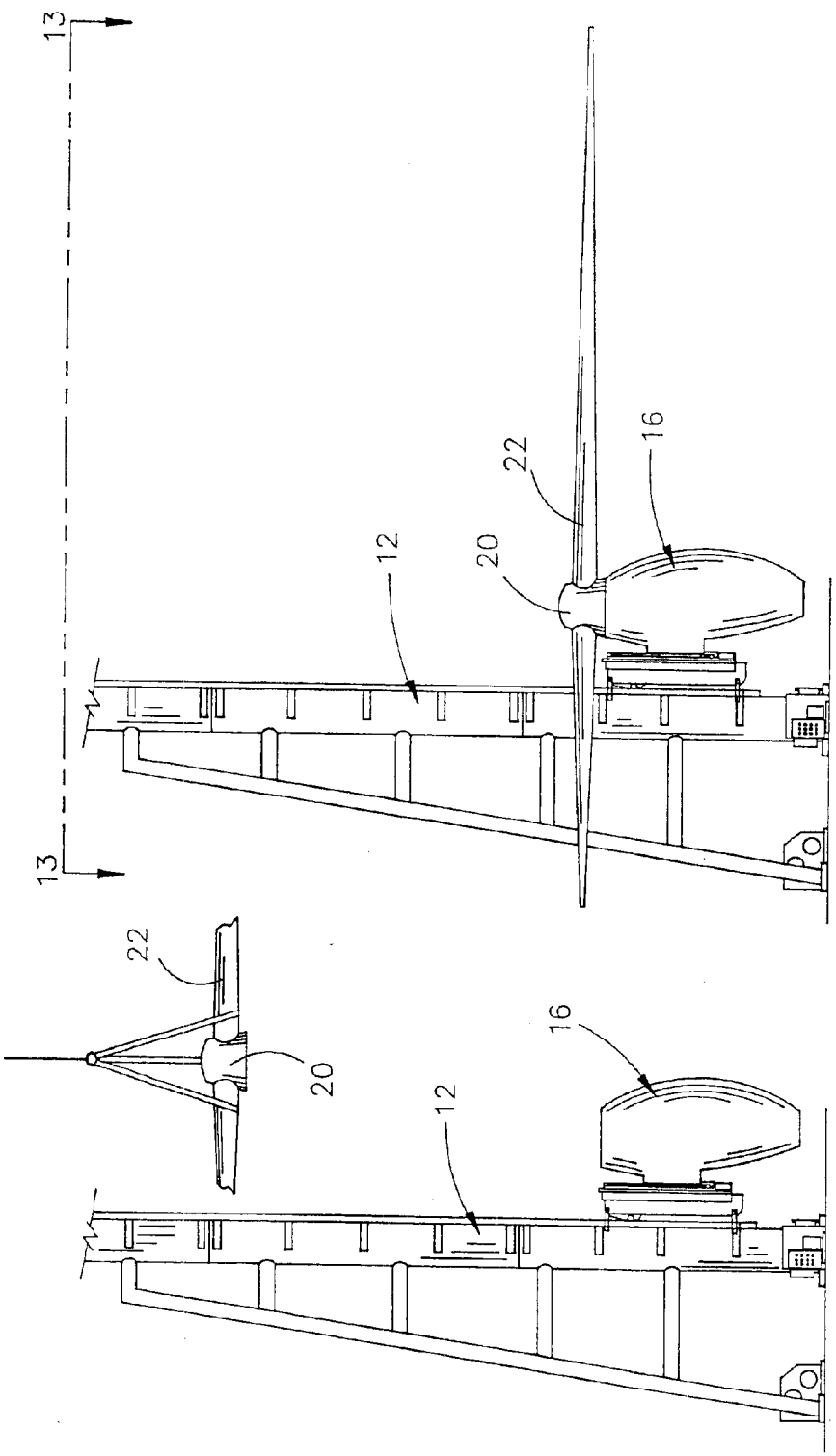

METHOD AND MEANS FOR MOUNTING A WIND TURBINE ON A TOWER

CROSS-REFERENCE TO RELATED APPLICATION

This is a continuation application of Petitioners' earlier application Ser. No. 09/829,362 filed Apr. 9, 2001, entitled "METHOD AND MEANS FOR MOUNTING A WIND TURBINE ON A TOWER" now abandoned which is a divisional application of Petitioners' U.S. earlier application Ser. No. 09/563,612 filed May 2, 2000, entitled "METHOD AND MEANS FOR MOUNTING A WIND TURBINE ON A TOWER" and which issued as U.S. Pat. No. 6,278,198 on Aug. 21, 2001.

BACKGROUND OF THE INVENTION

1. Field of the Invention

This invention relates to a method and means for mounting a wind turbine on the upper end of a supporting tower and more particularly to a method and means wherein the turbine is winched up the length of the tower on a carriage which rolls along a track or guide rail positioned at one side of the tower.

2. Description of the Related Art

Wind turbines are becoming more popular in the production of electrical energy. The wind turbine normally comprises a rotor-driven generator mounted atop a tower which may reach heights of 70 meters or more. The tower is normally first erected and the wind turbine is then normally mounted on the upper end of the tower by means of an extremely large crane. The customary method of mounting the wind turbine on the upper end of the tower is quite expensive in that the extremely large crane used for positioning the wind turbine on the tower is very expensive and it is costly to have such a crane on site during the erection procedure. Thus, it is advantageous to be able to mount the wind turbine on the upper end of the tower without the use of the extremely large crane.

SUMMARY OF THE INVENTION

The wind turbine assembly of this invention comprises a vertically disposed tower having upper and lower ends with the tower having a guide rail means positioned at one side of the tower which extends between the lower and upper ends thereof. A turbine support or carriage is provided which has a pivotal platform mounted thereon adapted to have the wind turbine mounted thereon. The carriage is initially supported on a wheeled frame means such as a truck, trailer or the like. The truck is positioned so that the carriage may be transferred from the truck to the lower end of the guide rail means. The carriage is initially positioned on the lower end of the guide rail in a vertically disposed position. Once the carriage has been mounted on the lower end of the guide rail, the platform of the carriage is pivotally moved to a horizontally disposed position to enable the turbine to be mounted thereon with the turbine being generally horizontally disposed. After the turbine has been secured to the platform, the platform is pivoted so that the wind turbine is substantially vertically disposed with the main shaft (rotor shaft) thereof being positioned at the upper portion of the wind turbine. The spinner/hub and rotor blades are then secured to the main shaft with the rotor blades being disposed in a horizontally disposed condition. A winch means then winches the carriage, with the wind turbine thereon, to the upper end of the tower. When the carriage reaches the upper end of the tower, the platform is again pivoted to cause the wind turbine to be again disposed in a substantially horizontally disposed position. The wind turbine is then slidably moved horizontally onto the upper end of the tower at which time the wind turbine is detached from the platform sled and is securely fashioned to the upper end of the tower. The carriage is then lowered to the lower end of the tower and is removed from the guide rails and placed onto the truck so that the carriage may be used for the erection of other wind turbine assemblies. An alternative method is also disclosed.

In the alternative method, the carriage is initially supported on a wheeled frame means such as a truck, trailer or the like as in the previously described method. The truck is positioned so that the carriage may be transferred from the truck to the lower end of the guide rail means. The carriage is initially positioned on the lower end of the guide rail in a vertically disposed position. Once the carriage has been mounted on the lower end of the guide rail, the platform of the carriage is pivotally moved to a horizontally disposed position to enable the turbine to be mounted thereon with the turbine being generally horizontally disposed and with the turbine being positioned so that the main shaft of the turbine extends towards one side of the tower. After the turbine has been secured to the platform, the carriage is winched upwardly on the tower a distance greater than the rotor-swept area. The spinner/hub and rotor blades are then secured to the main shaft with the rotor blades being disposed in a vertically disposed condition. The winch means then winches the carriage, with the wind turbine thereon, to the upper end of the tower. When the carriage reaches the upper end of the tower, the wind turbine is then slidably moved horizontally onto the upper end of the tower at which time the wind turbine is detached from the platform sled and is securely fashioned to the upper end of the tower. The carriage is then lowered to the lower end of the tower and is removed from the guide rails and placed onto the truck so that the carriage may be used for the erection of other wind turbine assemblies. In the alternative method, the wind turbine always remains in a horizontally disposed position, thereby eliminating any problems with liquids draining from the gearbox, generator, etc.

It is a principal object of the invention to provide an improved method of erecting a wind turbine assembly.

A further object of the invention is to provide a method of positioning a wind turbine on the upper end of a wind turbine tower wherein the need of an extremely large crane is eliminated.

Still another object of the invention is to provide a wind turbine assembly wherein the turbine tower has a guide rail at one side thereof to accommodate a carriage to be vertically moved upwardly thereon with the carriage supporting the wind turbine.

Still another object of the invention is to provide an improved method and means for erecting a wind turbine assembly which is less dangerous than the prior art methods of erecting the same.

A further object of the invention is to provide an improved tower for wind turbines.

These, and other objects will be apparent to those skilled in the art.

BRIEF DESCRIPTION OF THE DRAWINGS

FIG. 3A is a side view of the tower and illustrating the carriage supporting the wind turbine being supported on a trailer at the lower end of the tower;

FIG. 3B is a somewhat enlarged partial view of FIG. 3A;

FIG. 11 is a view similar to FIG. 10 but which illustrates the spinner/hub and rotors being lowered towards the wind turbine;

FIG. 12 is a view similar to FIG. 11 except that the spinner/hub and rotor blades have been mounted on the wind turbine;

DESCRIPTION OF THE PREFERRED EMBODIMENT

Figure 13:
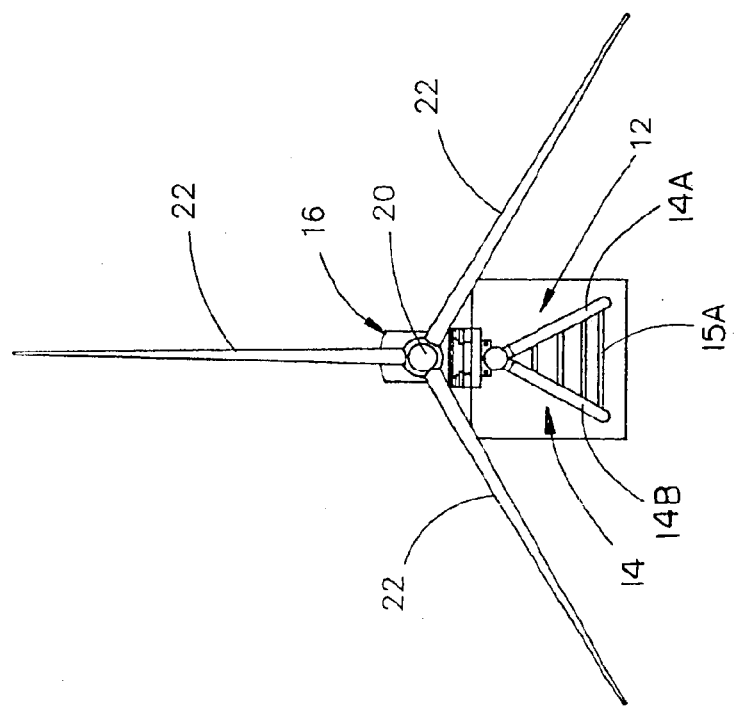
FIG. 13 is a view scene on lines 13—13 of FIG. 12.

The wind turbine assembly of this invention is referred to generally by the reference numeral 10 and includes a tower 12 which may have a height of up to seventy meters or more. A support structure 14 is in the form of a battered leg structure 14A and 14B is provided at one side of the tower 12 for stability purposes. Legs 14A and 14B are connected to the tower 12 by braces 15. Legs 14A and 14B are connected together by braces 15A, as seen in FIG. 13. The numeral 16 refers to a conventional wind turbine including a housing 18 which houses various components of the wind turbine 16 such as a cooling system, generator, gearbox, and a main shaft extending therefrom onto which a spinner/hub 20 is mounted including rotor blades 22. The wind turbine 16 includes a conventional base portion 24 which is secured to the upper end of the tower 12. To this point, the wind turbine assembly 10 is generally of conventional prior art construction except for the battered leg structure which stabilizes the tower 12, distributes the load on the tower 12, and enables the tower 12 to be constricted of a lighter weight material.

The tower 12 is provided with a guide rail means 26 which in this case comprises a pair of vertically disposed and horizontally spaced guide rails 28 and 30 positioned at one side of the tower 12 with the guide rails 28 and 30 extending between the lower and upper ends of the tower 12. Although it is preferred that a pair of guide rails 28 and 30 be provided, it is possible that any number of guide rails could be provided, if desired. Further, the guide rails 28 and 30 could be positioned on the opposite sides of the tower 12 and could take shapes other than that disclosed. For example, guide rails could be T-shaped if desired.

The numeral 32 refers generally to a carriage which is adapted to move along the guide rails 28 and 30 and which includes a platform 52 adapted to have the wind turbine 16 secured thereto and which includes means for pivoting the platform 52 approximately ninety degrees with respect to the carriage, as will be described in more detail hereinafter. It is preferred that the carriage 32 be removably positioned on a wheeled frame such as a truck or trailer 36 having a pair of spaced-apart guide rails 38 provided thereon which are adapted to mate with or register with the lower ends of the guide rails 28 and 30 so that the carriage 32 may be moved from its position on the wheeled frame means 36 onto the guide rails 28 and 30.

Figures 23, 24:
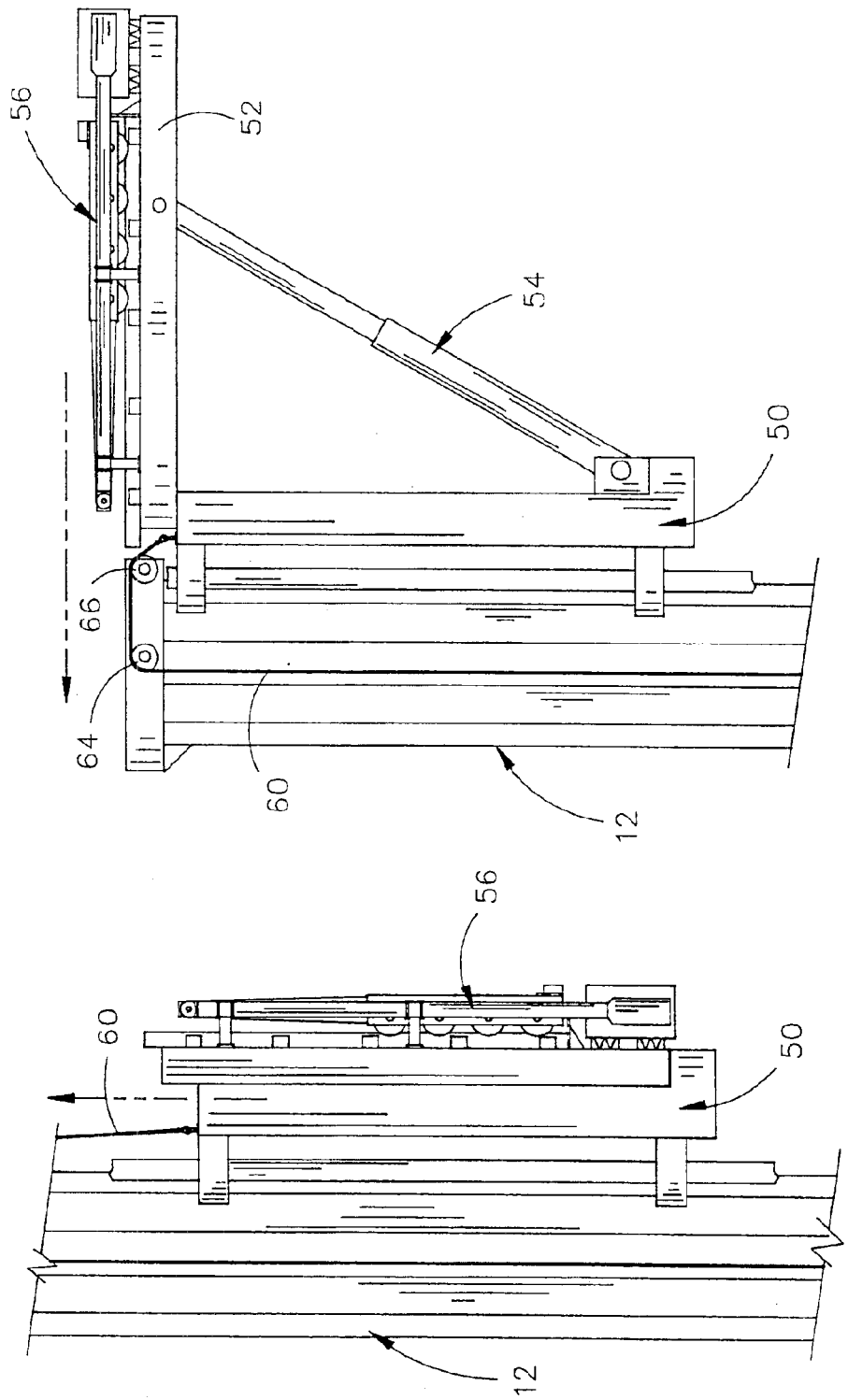
FIG. 23 is a partial side view illustrating the carriage platform in a vertically disposed position.
FIG. 24 is a partial side view illustrating the carriage platform having been moved to the upper end of the tower with the broken lines illustrating the movement of a portion of the carriage platform towards the upper end of the tower.

Carriage 32 includes a pair of projecting frame members 40 and 42 having recessed portions 44 and 46 formed therein, respectively, which are adapted to receive the guide rails 28 and 30 and which are also adapted to receive the guide rails 38 when the carriage 32 is mounted on the wheeled frame means 36. It is preferred that the recessed areas 44 and 46 be provided with a plurality of slides or rollers 48 provided thereon to facilitate the sliding movement of the carriage 32 with respect to the guide rails 28 and 30. Generally speaking, carriage 32 includes a frame means 50 having the platform 52 pivotally secured thereto and which is movable therewith by means of power cylinder 54 or some other mechanism. It is preferred that a slide mechanism 56 be slidably mounted on platform 52 to enable the slide mechanism 56 to be moved from the position illustrated in FIG. 24 to a position towards tower 12 to enable the turbine 16 to be moved from the carriage to the upper end of the tower 12 as will be more fully described hereinafter. Slide 56 includes means for having the wind turbine 16 selectively secured thereto.

Figure 21:
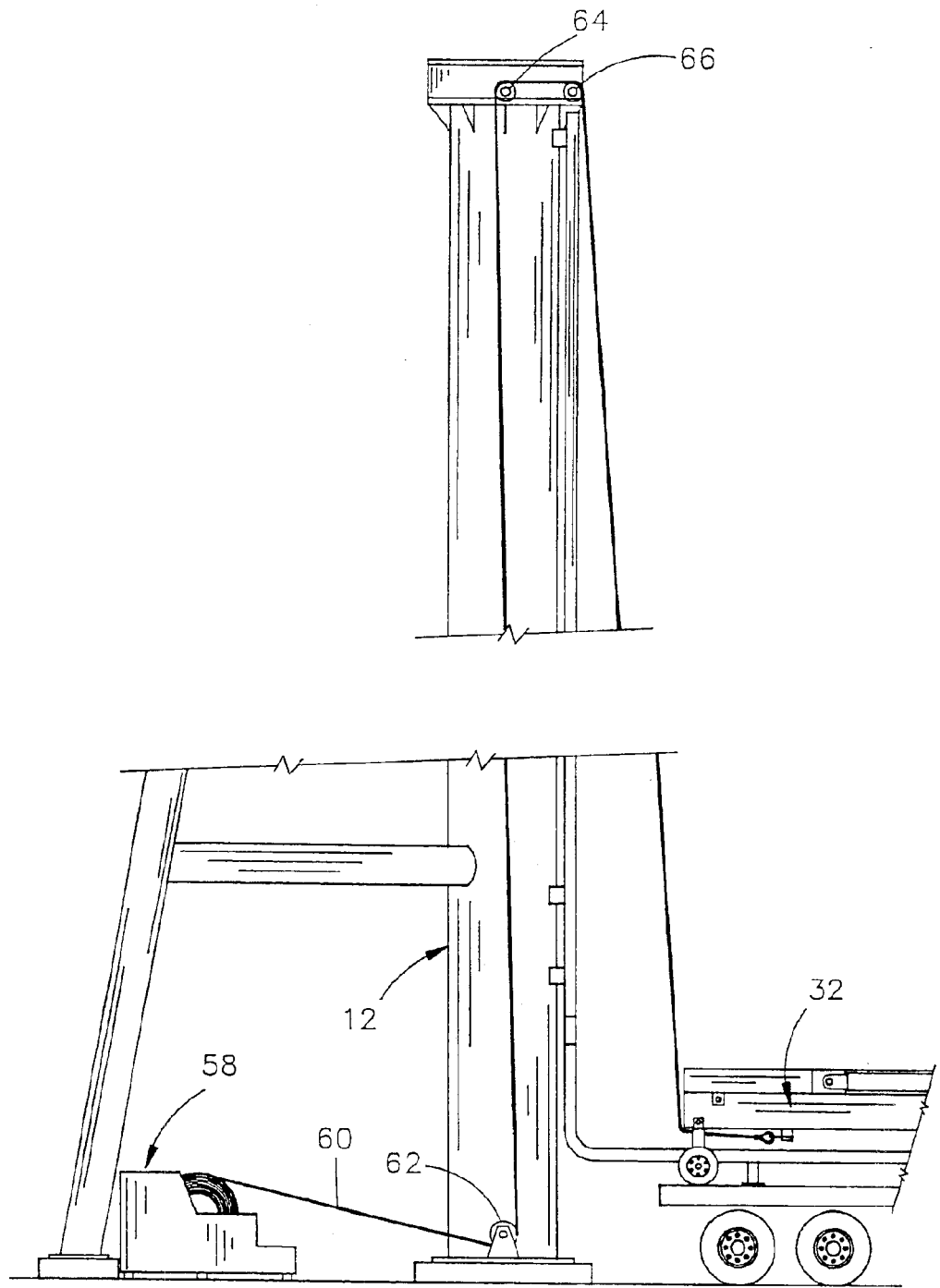
FIG. 21 is a partial side view illustrating the connection of the winch means with the carriage while the carriage is mounted on a trailer.
Figure 22:
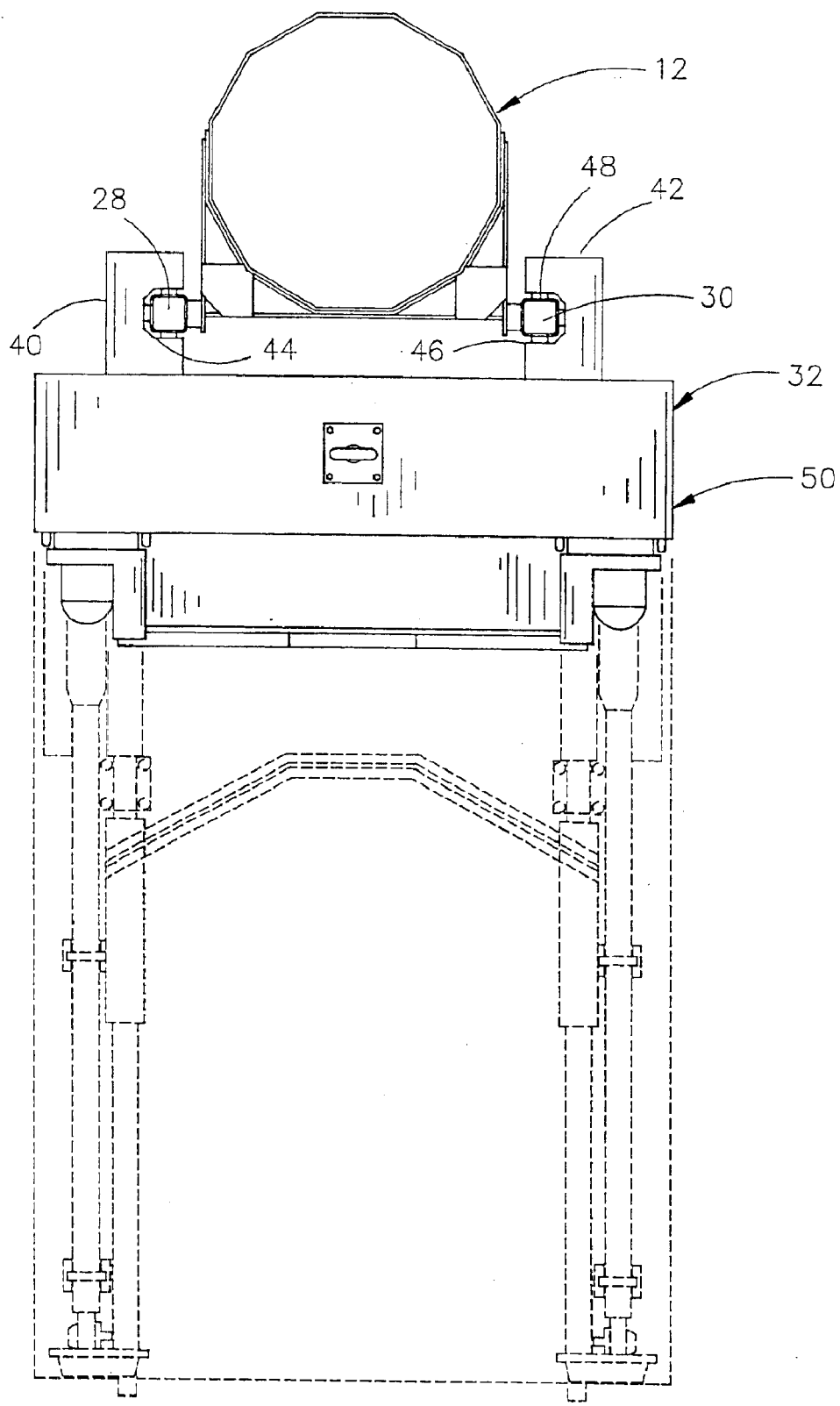
FIG. 22 is a sectional view illustrating the relationship of the tower, guide rail means and carriage.

The numeral 58 refers to a winch which is preferably positioned at the lower end of the tower 12 and which has a winch cable 60 extending therefrom. Winch cable 60 preferably extends around pulley 62 and thence upwardly to the upper end of the tower 12 wherein it extends over pulleys 64 and 66. Winch cable 60 then extends downwardly, as seen in FIG. 21, for connection to the carriage 32.

Figures 1, 2:
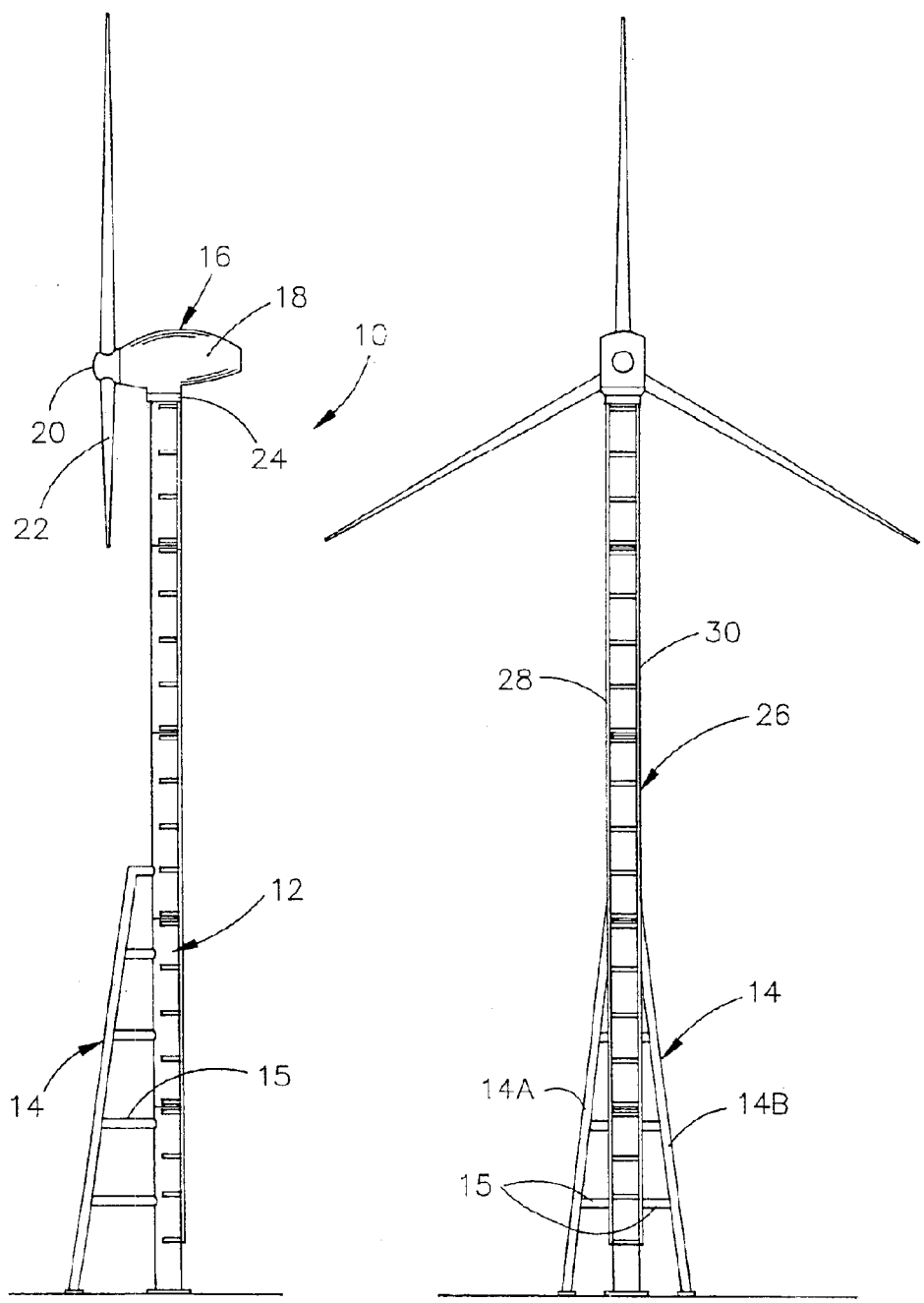
FIG. 1 is a side view of the wind turbine assembly of this invention.
FIG. 2 is a side view of the wind turbine assembly of FIG. 1 as seen from the right of FIG. 1.
Figure 5:
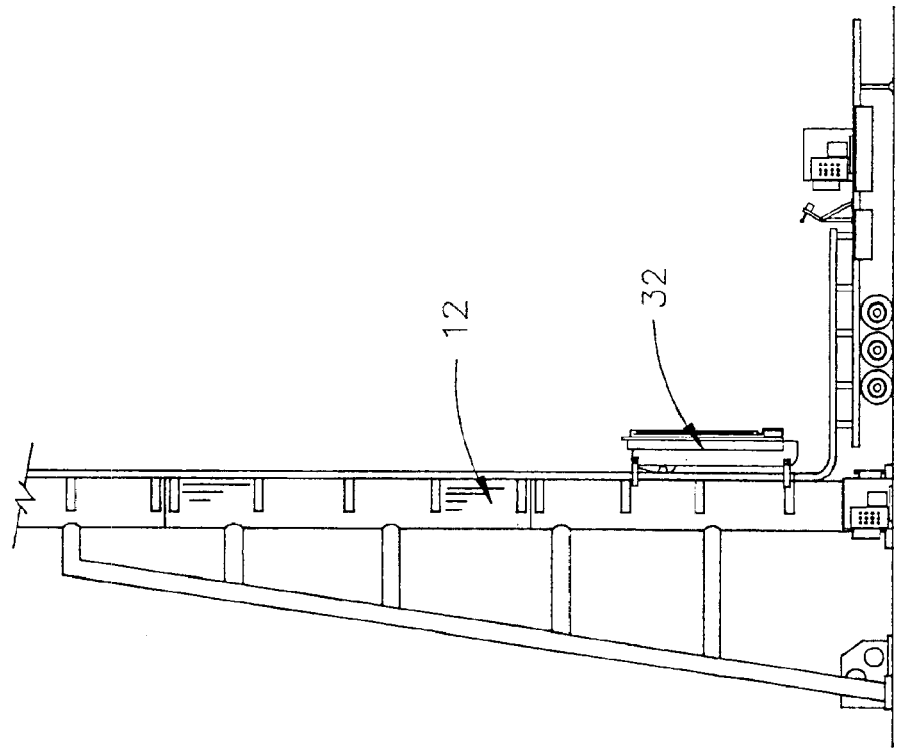
FIG. 5 is a view similar to FIG. 4 except that the carriage has been completely removed from the trailer and has been mounted on the carriage.
Figure 4:
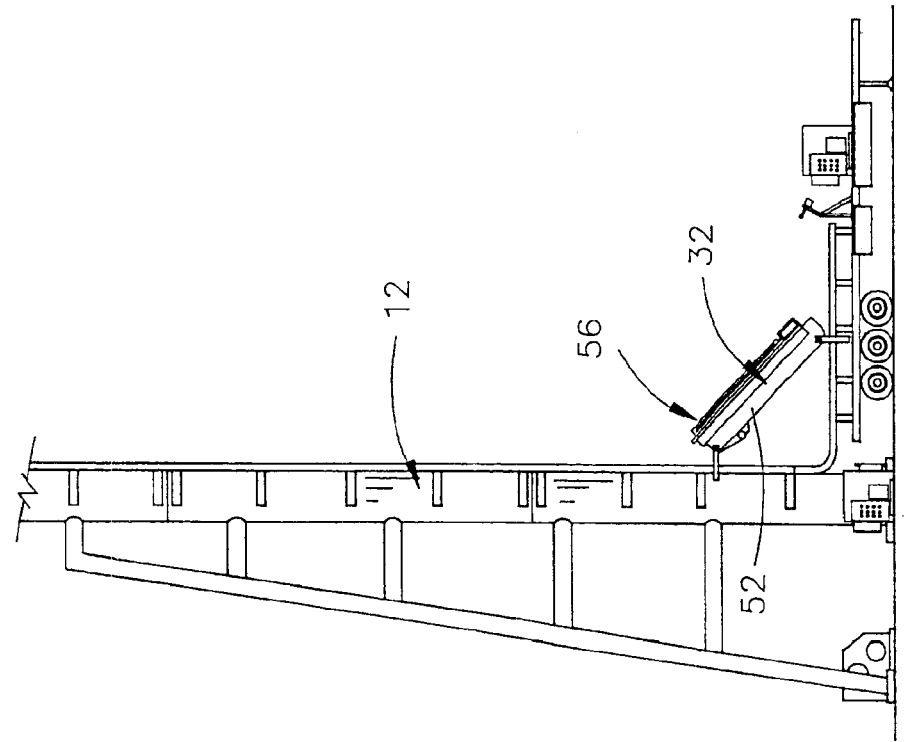
FIG. 4 is a view similar to FIG. 3B except that the carriage is being moved from the trailer to the guide rail.
Figure 6:
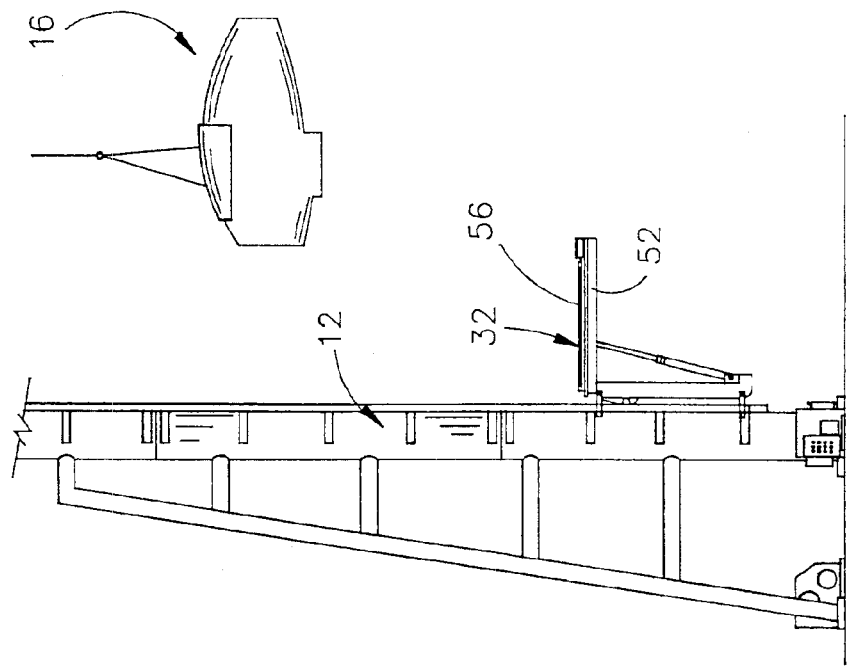
FIG. 6 is a view similar to FIG. 5 except that the platform of the carriage is being pivoted to a horizontal position.
Figure 7:
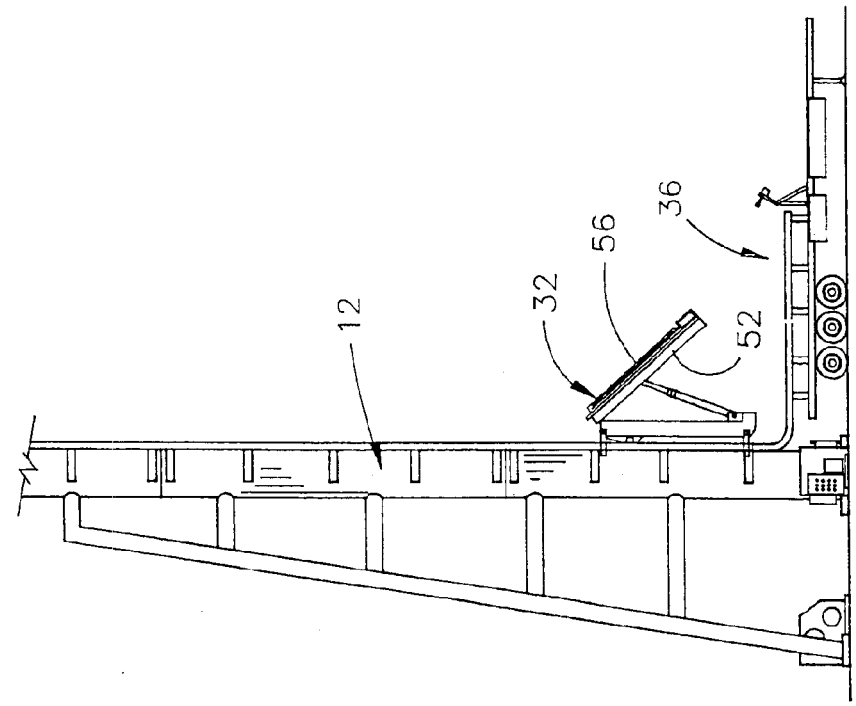
FIG. 7 is a view similar to FIG. 6 except that the platform of the carriage has been pivoted to a horizontal position and the wind turbine is being lowered towards the platform.
Figure 10:
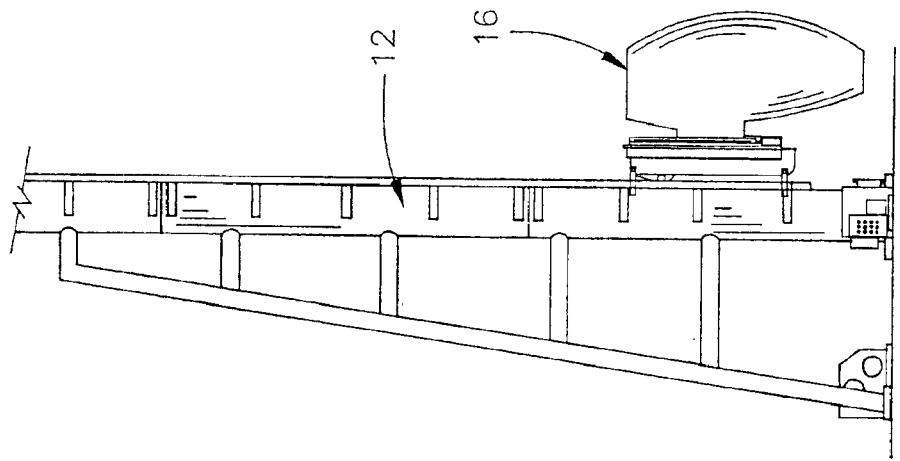
FIG. 10 is a view similar to FIG. 9 except that the carriage platform and wind turbine have been moved to a vertically disposed position.
Figure 9:
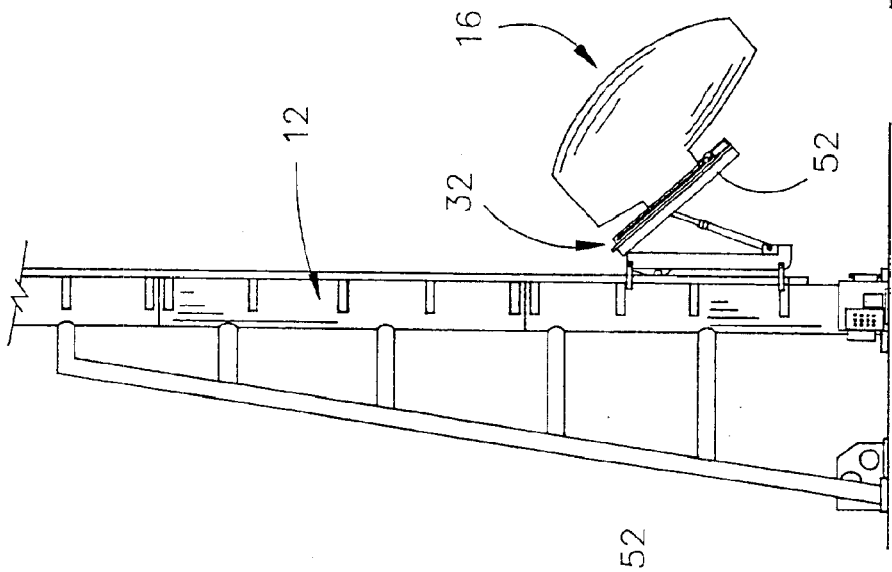
FIG. 9 is a view similar to FIG. 8 except that it illustrates the carriage platform and the turbine being moved to a vertically disposed position.
Figure 8:
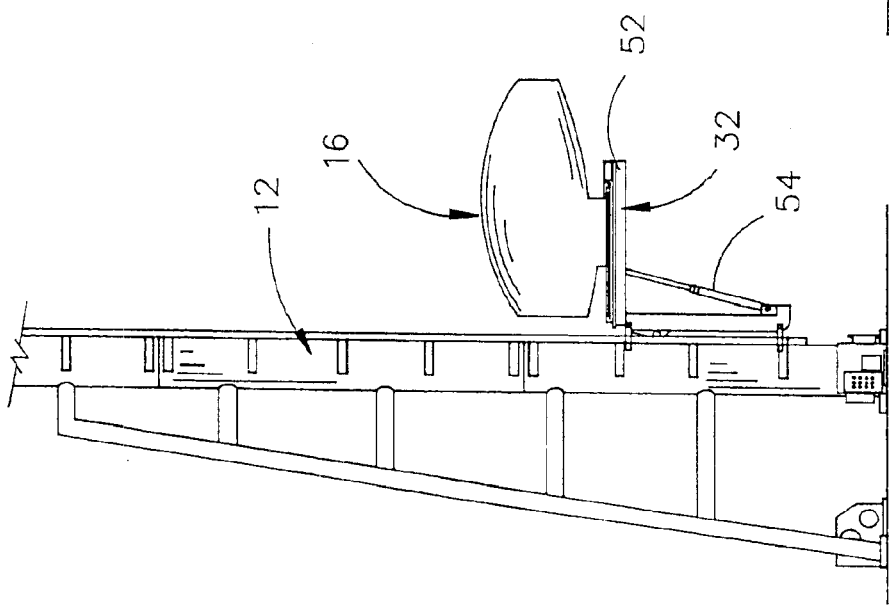
FIG. 8 is a view similar to FIG. 7 except that it illustrates the turbine positioned oh the platform of the carriage.

The tower 12 is first erected in conventional fashion, except for the structure 14, with the guide rails 28 and 30 being provided thereon as previously described. When it is desired to mount the turbine 16 on the upper end of the tower 12, the wheeled frame means 36 is positioned adjacent the lower end of the tower 12 so that the guide rails 38 mate with the lower ends of the guide rails 28 and 30. The winch cable 60 is then connected to the carriage 32 and the winch 58 is actuated so that the cable 60 pulls the carriage 32 from the wheeled frame means 32 onto the lower ends of the guide rails 28 and 30, as illustrated in FIGS. 4 and 5. When the carriage 32 has been positioned on the lower end of the guide rails 28 and 30, as illustrated in FIG. 5, the platform 52 is pivotally moved from the vertically disposed position of FIG. 5 to the position of FIG. 6 and then to the position of FIG. 7. At that time, the wheeled frame means 36 may be moved away from the lower end of the tower 12. When the platform 52 is in the position of FIG. 5, a small crane is then used to lower the wind turbine 16 onto the slide 56 to which it is securely fastened, as illustrated in FIG. 8. The platform 52 is then pivotally: moved from the position of FIG. 8 to the position of FIG. 9 and then to the position of FIG. 10 wherein the wind turbine 16 is substantially vertically disposed. When the wind turbine 16 is in the position of FIGS. 10 and 11, the spinner/hub 20 with the rotor blades 22 attached thereto is lowered onto the main shaft of the wind turbine 16 by means of a small crane or the like. It should be noted that the rotor blades 22 may be secured to the spinner/hub 20 after the spinner/hub 20 has been mounted on the wind turbine 16. FIG. 12 illustrates the spinner/hub 20 and the rotor blades 22 mounted on the wind turbine 16. FIG. 13 is a top view illustrating the wind turbine 16 in the position of FIG. 12.

Figure 14:
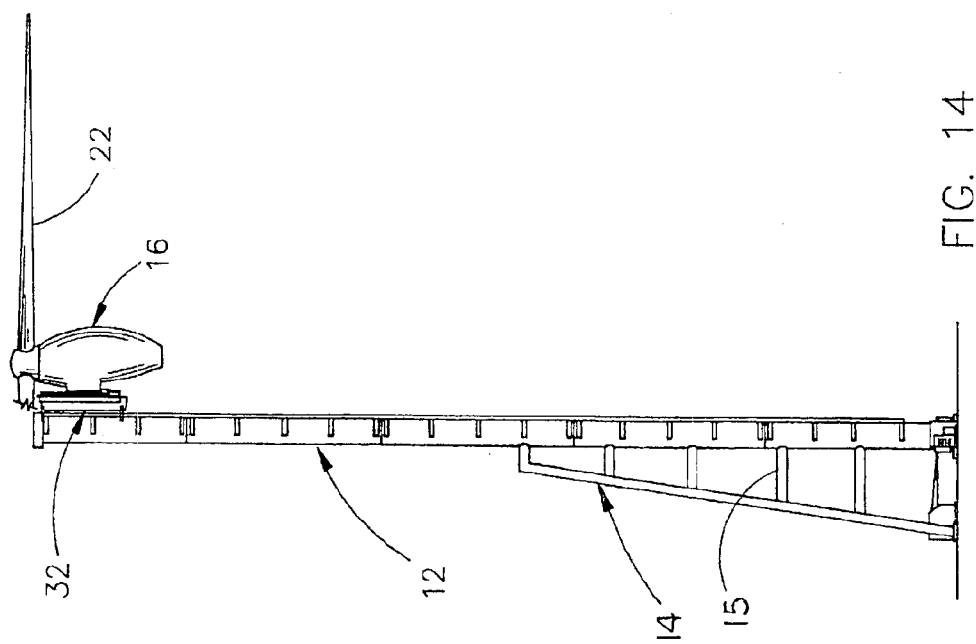
FIG. 14 is a side view illustrating the carriage and wind turbine having been moved to the upper end of the tower.
Figures 15, 16, 17:
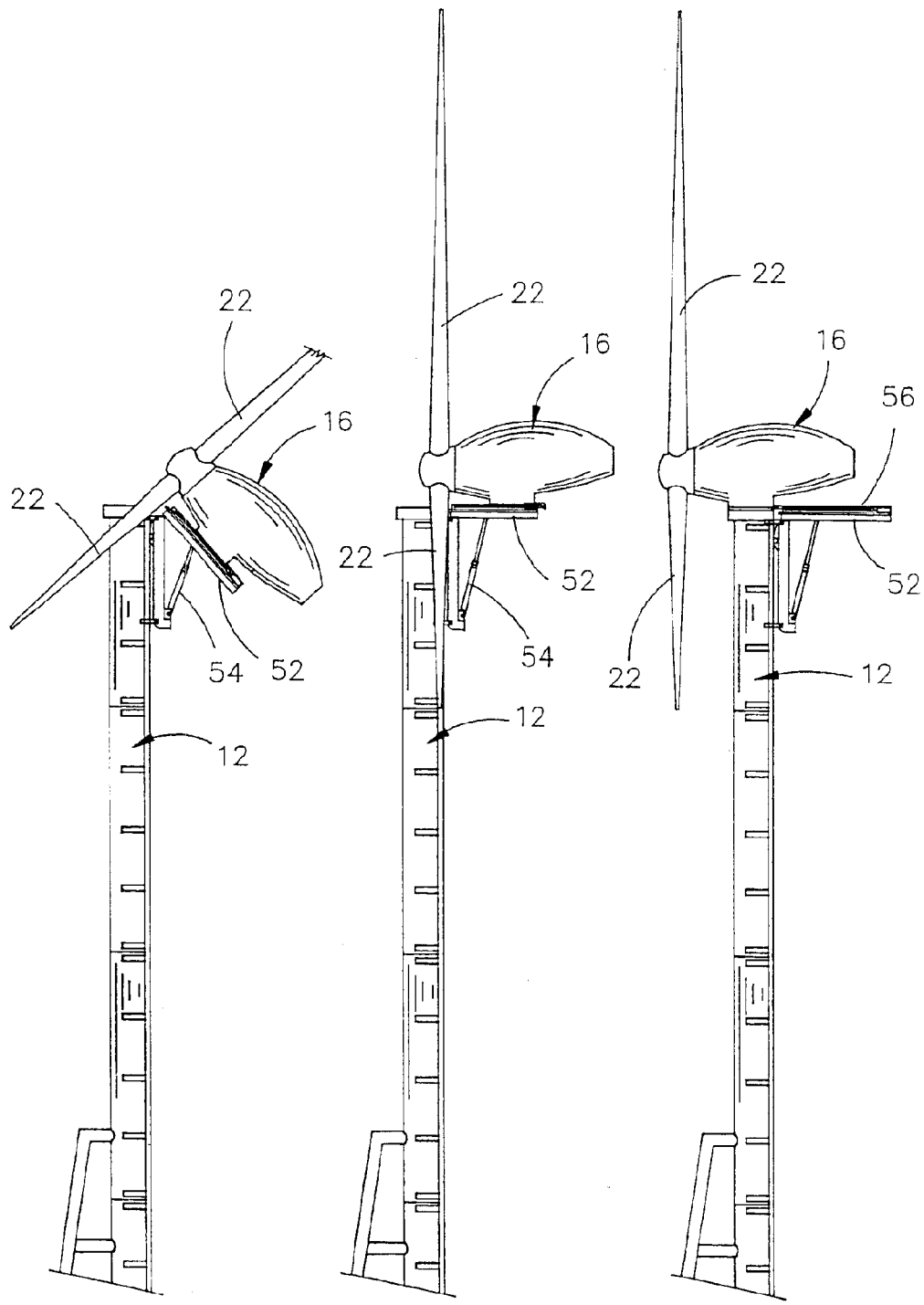
FIG. 15 is a view similar to FIG. 14 except that the carriage platform is being pivoted from its vertically disposed position to its horizontal position.
FIG. 16 is a view similar to FIG. 15 except that the carriage platform and turbine have been moved to a horizontally disposed position.
FIG. 17 is a view similar to FIG. 16 except that the turbine is illustrated as having been slidably moved from the carriage platform to the upper end of the tower.
Figure 18:
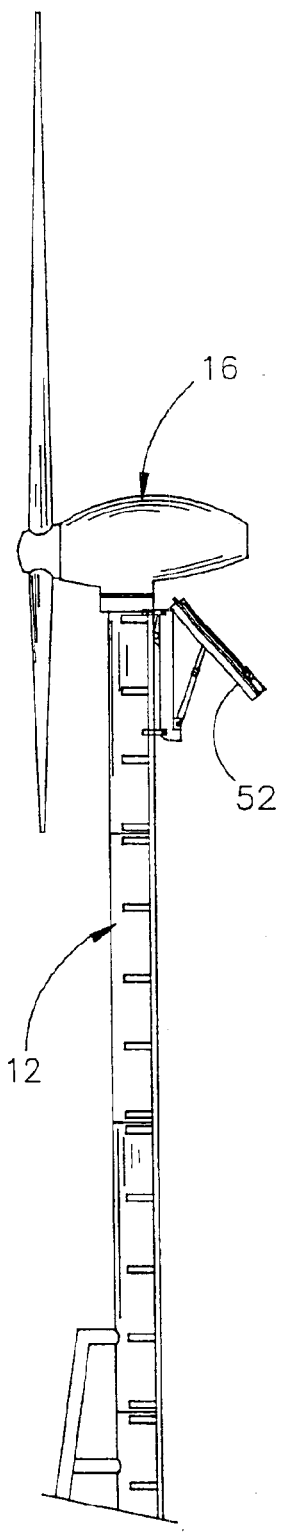
FIG. 18 is a view similar to FIG. 17 except that the carriage platform is illustrated as-being pivotally moved towards a vertically disposed position.
Figure 19:
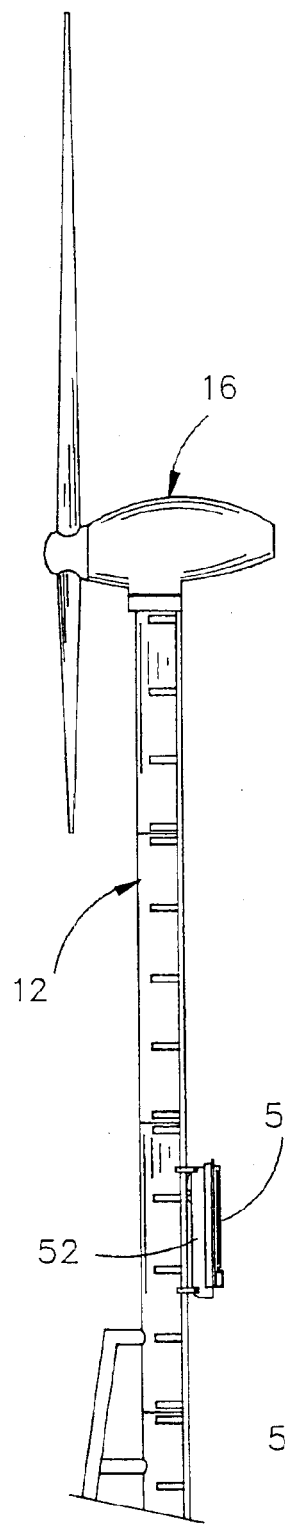
FIG. 19 is a view similar to FIG. 18 except that the carriage is illustrated as being lowered towards the ground.
Figure 20:
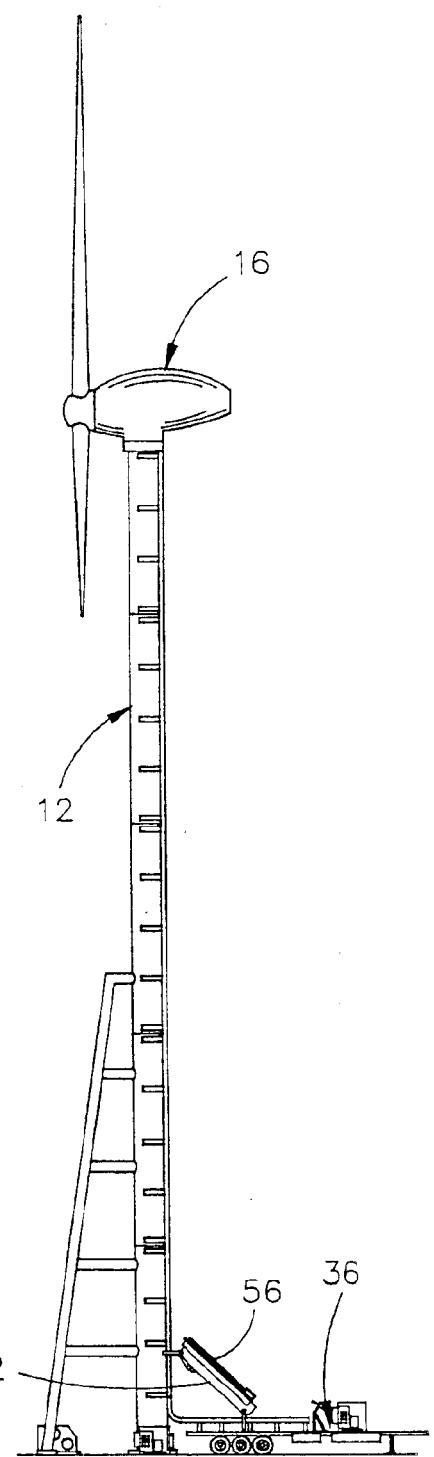
FIG. 20 is a view similar to FIG. 19 except that the carriage is being illustrated as being moved onto the trailer.

When the spinner/hub 20 and rotor blades 22 have been mounted on the wind turbine 16, the carriage 32 with the wind turbine 16 mounted thereon is winched to the upper end of the tower 12 by means of the winch 58. When the carriage 32 has been winched to the position of FIG. 14, the platform 52 is pivotally moved from its vertically disposed position to the position of FIG. 15 and then to the position of FIG. 16. The slide 56 is then moved towards the upper end of the tower 24, as indicated by the dashed arrow in FIG. 24, so that the wind turbine 16 may be removed from the slide 56 and secured to the upper end of the tower 24. When the turbine 16 has been secured to the upper end of the tower 12, as illustrated in FIG. 18, the platform 52 is pivotally moved from its horizontally disposed position to the position of FIG. 18 and then to a vertically disposed position. The carriage 32 is then lowered on the guide rails 28 and 30 to the lower end of the tower. The wheeled frame means 36 is then positioned adjacent the lower end of the tower so that the guide rails 38 thereof register once again with the guide rails 28 and 30. The carriage 32 is then moved from the guide rails 28 and 30 onto the guide rails 38 of the wheeled frame means 36 so that the carriage 32 is positioned on the wheeled frame means 36. The wheeled frame means 36 and the carriage 32 may then be moved to another location wherein another wind turbine assembly 10 is to be erected.

The turbine 16 may be installed or mounted on the upper end of the tower in a somewhat different way such as will now be described. As in the previously described method, when it is desired to mount the turbine 16 on the upper end of the tower 12, the wheeled frame means 36 is positioned adjacent the lower end of the tower 12 so that the guide rails 38 mate with the lower ends of the guide rails 28 and 30. The winch cable 60 is then connected to the carriage 32 and the winch 58 is actuated so that the cable 60 pulls the carriage 32 from the wheeled frame means 36 onto the lower ends of the guide rails 28 and 30. When the carriage 32 has been positioned on the lower end of the guide rails 28 and 30, the platform 52 is pivotally moved from the vertically disposed position of FIG. 5 to the position of FIG. 6 and then to the position of FIG. 7. At that time, the wheeled frame means 36 may be moved away from the lower end of the tower 12. When the platform 52 is in the position of FIG. 5, the carriage 32 is, then winched upwardly along the guide rails 28 and 30 until the carriage has reached a height which is greater than the rotor-swept area. The wind turbine 16 is then positioned on the platform 52 of the carriage 32 by means of a small crane with the wind turbine 16 being horizontally disposed and with the main shaft thereof extending laterally from one side of the tower. The spinner/hub 20 with the rotor blades 22 attached thereto are then secured to the main shaft of the wind turbine 16 with the rotor blades being vertically disposed.

When the spinner/hub 20 and the rotor blades 22 have been mounted on the wind turbine 16, the carriage 32 with the wind turbine 16 mounted thereon is winched to the upper end of the tower 12 by means of the winch 58. When the carriage 32 has been winched to the upper end of the tower, the slide 56 is then moved towards the upper end of the tower 24 so that the wind turbine 16 may be removed from the slide 56 and secured to the upper end of the tower 24. When the turbine 16 has been secured to the upper end of the tower 12, the carriage 32 is then lowered on the guide rails 28 and 30 to the lower end of the tower, as in the previously described method.

The advantage of the alternate method is that the wind turbine is always in a horizontally disposed position. In some cases, if the wind turbine was vertically disposed and components of the turbine have been previously filled with lubricating fluids, cooling fluids, etc., some leakage could possibly occur. By maintaining the wind turbine in the horizontally disposed condition, leakage problems are eliminated.

Although the preferred method of moving the wind turbine to the upper end of the tower is with a winch, it is possible that other means could be utilized. For example, some form of ratcheting mechanism could be utilized. A rack and pinion gear arrangement which is motor-driven could also be used.

Thus it can be seen that a novel apparatus has been provided for mounting a wind turbine on the upper end of a wind turbine tower involving the use of a carriage which is movably mounted on guide rails provided on the tower and wherein the need for an extremely large crane is eliminated. The relationship of the carriage 32 with respect to the guide rails 28 and 30 ensures that undesirable horizontal movement between the carriage 32 and the guide rails 28 and 30 will be prevented while permitting the desirable vertical movement of the carriage 32 on the guide rails 28 and 30.

It can therefore be seen that a novel apparatus and method has been provided which accomplishes at least all of its stated objectives.

We claim:

1. In combination:
   a vertically disposed wind turbine tower extending upwardly from the ground and having upper and lower ends;
   said tower being comprised of a tubular member;
   at least a first ground engaging battered leg having upper and lower ends;

at least a second ground engaging battered leg having upper and lower ends;

said upper ends of said first and second battered legs being secured to said tower between the upper and lower ends of said tower;

said first and second battered legs extending downwardly and outwardly from said tower in a diverging relationship with respect to each other for anchored ground engagement;

and a plurality of horizontally disposed braces secured to and extending between said first and second battered legs.

2. In combination:

a vertically disposed wind turbine tower extending upwardly from the ground and having upper and lower ends;

said tower being comprised of a tubular member;

at least a first ground engaging battered leg having upper and lower ends;

at least a second ground engaging battered leg having upper and lower ends;

said upper ends of said first and second battered legs being secured to said tower between the upper and lower ends of said tower;

said first and second battered legs extending downwardly and outwardly from said tower in a diverging relationship with respect to each other for anchored ground engagement;

a plurality of horizontally disposed braces secured to and extending between each of said battered legs and said tower;

and a plurality of horizontally disposed braces secured to and extending between said first and second battered legs.

* * * * *